United States Patent
Nawaz et al.

(10) Patent No.: US 9,443,092 B2
(45) Date of Patent: Sep. 13, 2016

(54) SYSTEM AND METHOD FOR MATCHING DATA SETS WHILE MAINTAINING PRIVACY OF EACH DATA SET

(71) Applicant: Pitney Bowes Inc., Danbury, CT (US)

(72) Inventors: Yassir Nawaz, Shelton, CT (US); Femi Olumofin, Trumbull, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 14/543,959

(22) Filed: Nov. 18, 2014

(65) Prior Publication Data
US 2016/0140348 A1    May 19, 2016

(51) Int. Cl.
| | |
|---|---|
| G06F 21/00 | (2013.01) |
| G06F 21/60 | (2013.01) |
| H04L 29/06 | (2006.01) |
| H04L 29/08 | (2006.01) |
| H04W 12/04 | (2009.01) |
| G06F 9/445 | (2006.01) |
| H04L 9/08 | (2006.01) |
| H04L 12/24 | (2006.01) |

(52) U.S. Cl.
CPC ........... *G06F 21/602* (2013.01); *G06F 8/61* (2013.01); *H04L 9/083* (2013.01); *H04L 41/0806* (2013.01); *H04L 63/067* (2013.01); *H04L 63/0815* (2013.01); *H04L 63/145* (2013.01); *H04L 67/02* (2013.01); *H04L 67/10* (2013.01); *H04L 2463/062* (2013.01); *H04W 12/04* (2013.01)

(58) Field of Classification Search
CPC ..... H04L 63/145; H04L 67/02; H04L 67/10; H04L 63/0815; H04L 9/083; H04L 63/067; H04L 2463/062; H04L 41/0806; G06F 21/602; G06F 8/61; H04W 12/04
See application file for complete search history.

(56) References Cited

U.S. PATENT DOCUMENTS

| | | | | |
|---|---|---|---|---|
| 5,592,552 | A * | 1/1997 | Fiat ................ | H04L 63/0442 380/278 |
| 6,434,662 | B1 * | 8/2002 | Greene ............ | G06F 17/30949 707/E17.035 |
| 2003/0084003 | A1 * | 5/2003 | Pinkas .............. | G06Q 20/3829 705/71 |
| 2005/0147240 | A1 * | 7/2005 | Agrawal .......... | G06F 21/60 380/28 |
| 2006/0245587 | A1 | 11/2006 | Pinkas | |

(Continued)

OTHER PUBLICATIONS

Paiffier, Pascal, "Public-key Cryptosystems Based on Composite Degree Residuosity Classes" J. Stern (Ed.): EUROCRYPT'99, LNCS 1592, pp. 223-238, 1999.
Freedman, Nissim, Pinkas, "Efficient Private Matching and Set Intersection", Apr. 23, 2004, Advances in Cyptology—Eurocrypt, 2004; (Lecture Notes in computer science; LNCS), Springer-Verlag, Berlin/Heidelberg, pp. 1-19, XP019005014, ISBN: 978-3-540-21935-4.

(Continued)

*Primary Examiner* — Mohammad A Siddiqi
(74) *Attorney, Agent, or Firm* — Brian A. Lemm; Charles R. Malandra, Jr.; Steven J. Shapiro

(57) ABSTRACT

A system and method that allows two parties to find common records in their data sets without having to actually share the data sets with each other or a third party. Two primitives, perfect hash functions and public key cryptography, are combined in a unique way to obtain a secure and efficient private matching solution. Since the data that is exchanged is always encrypted during the match process, neither party reveals its data to the other party. This solution enables two parties to match sensitive data such as PII (Personally Identifiable Information) or PHI (Protected Health Information) without having to disclose the data to other or to any third party. One or both of the parties only learn of matching records without learning any information about the records that do not match.

2 Claims, 2 Drawing Sheets

(56) References Cited

U.S. PATENT DOCUMENTS

| | | | | |
|---|---|---|---|---|
| 2010/0269008 | A1* | 10/2010 | Leggette | G06F 11/1076 714/752 |
| 2014/0188893 | A1* | 7/2014 | Kobayashi | G06F 17/3033 707/747 |
| 2015/0058595 | A1* | 2/2015 | Gura | G06F 12/1018 711/206 |
| 2015/0143112 | A1* | 5/2015 | Yavuz | G06F 17/3033 713/165 |
| 2015/0199528 | A1* | 7/2015 | Bobinski | G06F 21/602 713/191 |

OTHER PUBLICATIONS

Femi Olumofin, Ian Goldberg, "Privacy-Preserving Queries over Relational Databases", Jul. 21, 2010, Privacy Enhancing Technologies. Springer Berlin Heidelberg, Berlin, Heidelberg, pp. 75-92, XP019147276, ISBN 978-3-642-14526-1.

De Cristofaro, Gasti, Tsudik, "Fast and Private Computation of Cardinality of Set Intersection and Union", International Association for Cryptologic Research, vol. 20130814:165930, Aug. 14, 2013, pp. 1-13, XP061007607.

* cited by examiner

SYSTEM AND METHOD FOR MATCHING DATA SETS WHILE MAINTAINING PRIVACY OF EACH DATA SET

FIELD OF THE INVENTION

The present invention relates to data matching and information privacy, and in particular to a system and method for allowing two parties to match data sets while maintaining the privacy of each data set.

BACKGROUND OF THE INVENTION

Data matching is a key component in data integration and data quality. Data matching is often performed between two parties with data on common entities. The purpose of matching could be to perform checks or develop deeper insights about those entities. However, sometimes the data in question is sensitive and the parties don't want to share their datasets with each other or a third party to do the match. For example, consider two companies each with its own customer database. For a joint marketing campaign the two companies want to find which individuals are customers of both companies. An easy method to nod common customers is for companies to exchange their databases with each other or to give it to a third party for the match. However, both companies are reluctant to share their customer database with anyone due to concerns around data security and privacy. In some cases, especially if the company belongs to a regulated industry, the privacy regulations prevent the companies from sharing customer data such as PII (Personally Identifiable Information) or PHI (Protected Health Information).

SUMMARY OF THE INVENTION

The present invention alleviates the problems described above by providing a system and method that allows two parties to find common records in their data sets without having to actually share the data sets with each other or a third party.

In accordance with embodiments of the present invention, two primitives, perfect hash functions and public key cryptograph, are combined in a unique way to obtain a secure and efficient private matching solution. To match sensitive data, the first party computes a perfect hash function from its dataset. It also encrypts its data set using a public key cryptography algorithm. The first party then sends the perfect hash function, its encrypted data set and its public key to the second party. The second party evaluates the perfect hash of its data set using the provided perfect hash function and also encrypts its data using the provided public key. For each of its record the second party computes a function that involves the output of the perfect hash function, encrypted records of both parties and a randomly generated number. The outputs of the function over the records are then returned to the first party. The first party uses its private key to decrypt these outputs. If an output matches a pre-determined value of a record then the corresponding record is considered a match otherwise the output is ignored. Since, the data that is exchanged is always encrypted during the match process neither party reveals its data to the other party. This solution enables two parties to match sensitive data such as PII and PHI without having to disclose the data to each other or to any third party. One or both of the parties only learn of matching records without learning any information about the records that do not match.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION OF THE PRESENT INVENTION

Figure 1:
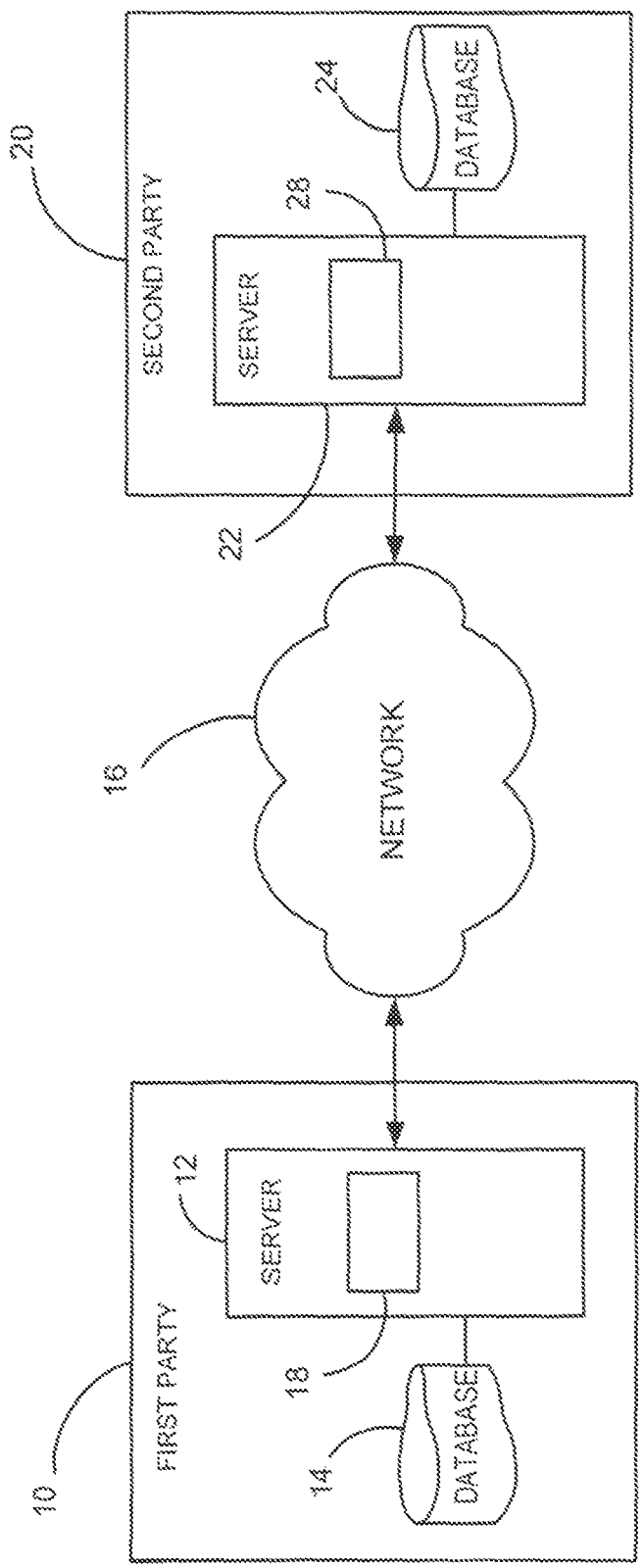
FIG. 1 is a block diagram of a portion of a private data matching system according to embodiments of the present invention.

In describing the present invention, reference is made to the drawings, wherein there is seen in FIG. 1 in block diagram form a portion of a private data matching system that can be used to implement the method described herein according to embodiments of the present invention. A first party 10 includes a server 12 operated by the first party, which may be, for example, a business, organization, or any other type of entity. Server 12 is coupled to a database 14, which may be any suitable type of memory device utilized to store information. Such information can include, far example, information related to customers of the first party 10, or other information as desired by the first party 10. Server 12 is coupled to a network 16, such as, for example the Internet. A second party 20 includes a server 22 operated by the second party, which may be, for example, a business, organization or any other type of entity. Server 22 is coupled to a database 24, which may be any suitable type of memory device utilized to store information. Such information can include, for example, information related to customers of the second party 10, or other information as desired by the second party 10.

Servers 12, 22 may be a mainframe or the like that includes at least one processing device 18, 28, respectively. Servers 12, 22 may be specially constructed for the required purposes, or it may comprise a general purpose computer selectively activated or reconfigured by a computer program (described further below) stored therein. Such a computer program may alternatively be stored in a computer readable storage medium, such as, but not limited to any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, which are executable by the processing devices 18, 28. One of ordinary skill in the art would be familiar with the general components of it computing system upon which the method of the present invention may be performed. A network interface is provided to allow the servers 12, 22 to communicate with each other and other devices via the network 16.

Figure 2:
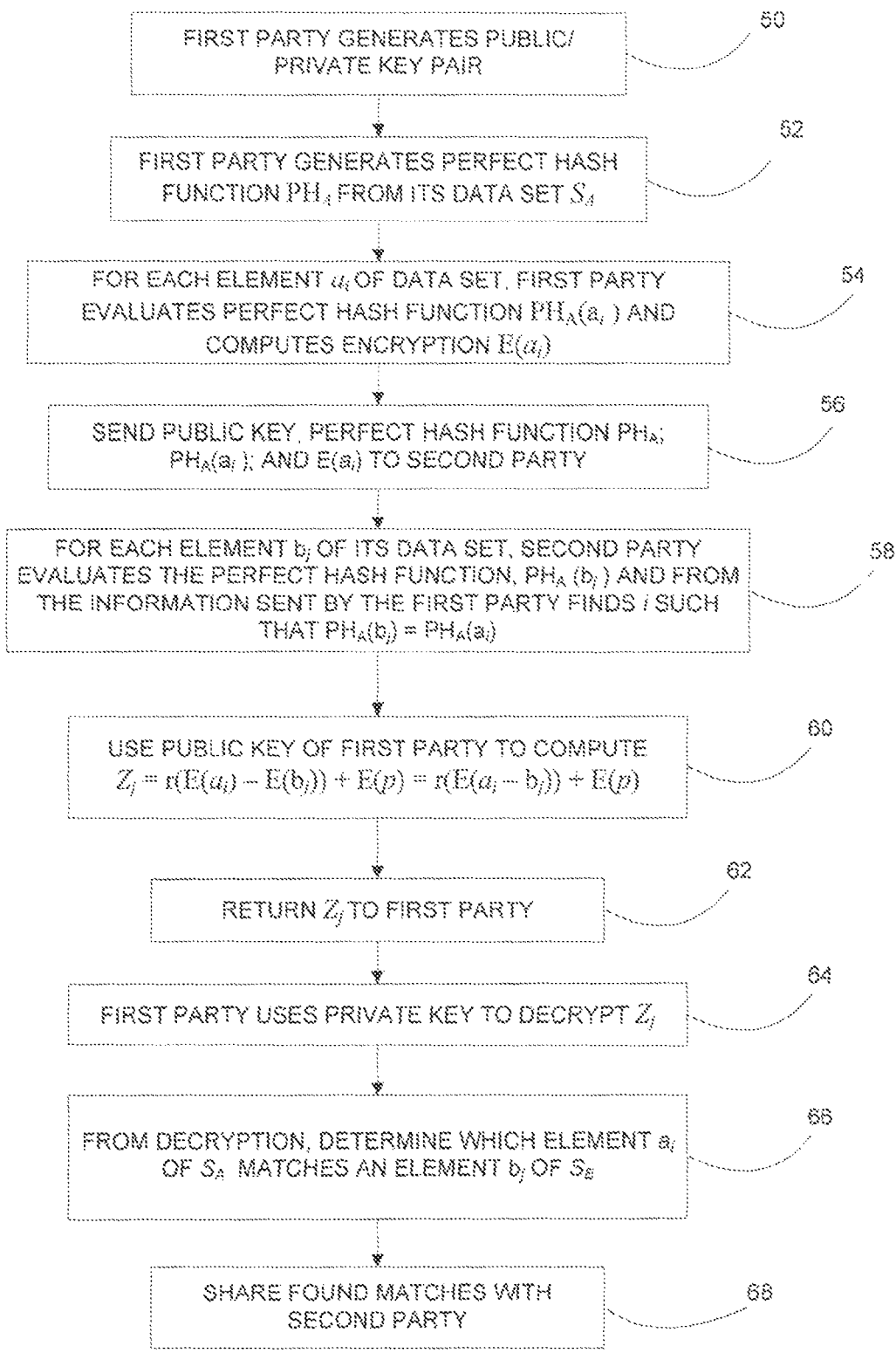
FIG. 2 is a flow chart illustrating the operation of the private data matching system according to an embodiment of the present invention.

The processing performed by the servers 12, 22 according to embodiments of the present invention allow the first party 10 and second party 20 to find common records in datasets stored in their respective databases 14, 24 without having to actually share their datasets with each other or with any third party. FIG. 2 is a flowchart illustrating such processing according to an embodiment of the present invention. The processing combines two primitives, perfect hash functions and public key cryptography with special properties, to construct a private matching solution. A perfect hash function for a set S is a hash function that maps each entry in that set to a set of integers without any collisions, i.e. no two members of the set S are mapped to the same integer by the perfect hash function. Once the perfect hash function for a set S has been created, the hash of any member of S can be evaluated in constant time. It is important to note that if the perfect hash function created for set S is used to evaluate the hash of a non-member of S, then the hash of the non-member of S can collide with the hash of a member of S. A minimal perfect hash function is a perfect hash function that maps n elements of a set S to n consecutive integers. Minimal perfect hash functions are desirable because of their compact representation. Embodiments of the present invention can work with any perfect hash function, including minimal perfect hash functions. While any perfect hash function can be utilized, it is desirable to have a perfect hash function which does not leak any information about the input set S from which it was constructed, or leaks only a negligible amount of information.

A public key homomorphic encryption scheme is a public key encryption scheme that allows certain operations on the encrypted information without the knowledge of the private key. The present invention utilizes a homomorphic encryption scheme that has the following properties; (i) Given encryptions $E(m1)$ and $E(m2)$ of two messages m1 and m2 respectively, $E(m1-m2)$ can be efficiently computed without the knowledge of the private key; and (ii) Given a constant value c and encryption $E(m)$ of a message m, $E(cm)$ can be efficiently computed without the knowledge of the private key. One such public key encryption scheme that fulfils these requirements is the Paillier Cryptosystem, as described in "Public-key cryptosystems based on composite degree residuosity classes," Advances in Cryptology-EUROCRYP 99, pages 223-238, Prague, Czech Republic, May 1999. While this scheme will be used to describe embodiments of the present invention, this particular scheme is not essential, and any public key encryption scheme with the above properties can be used.

Referring now to FIG. 3 in conjunction with FIG. 1, suppose that first party 10 has a private data set $S_A$ stored in database 14, and second party 20 has a dataset $S_B$ stored in database 24. The set $S_A$ has n elements, i.e., $S_A=\{a_1, a_2, \ldots a_n\}$ and set $S_B$ has m elements, i.e., $S_B=\{b_1, b_2, \ldots b_m\}$. Both first party 10 and second party 20 want to find matching elements of sets $S_A$ and $S_B$ without revealing them to each other or to a third party. In step 50, the server 12 of first party 10 generates a public/private key pair of a homomorphic encryption scheme, such as, for example, the Paillier cryptosytem. In step 52, server 12 then generates a perfect hash function $PH_A$ from it data set $S_A$. The perfect hash function $PH_A$ is a data structure that allows anyone to compute or evaluate the hash of an input. In step 54, for each element $a_i$, $1 \leq i \leq n$, of $S_A$, server 12 evaluates the perfect hash function, $PH_A(a_i)$, and computes the encryption, $E(a_i)$, of $a_i$ using its public key.

In step 56, first party 10, using server 12, then sends the following information to the server 22 of the second party 20, using, for example, the network 16: (i) the public key of first party 10, (ii) $PH_A$ (computed from $S_A$) as generated in step 52; and (iii) $PH_A(a_i)$, $E(a_i)$, for all i, $1 \leq i \leq n$ as evaluated and computed in step 54.

Upon receiving the above information from first party 10, the server 22, of second party 20 starts its computations. In step 58, for each element $b_j$, $1 \leq j \leq m$, of $S_B$, server 22 evaluates the perfect hash function, $PH_A (b_j)$ and from the information sent by the first party 10, finds i such that $PH_A(b_j)=PH_A(a_i)$. Note that $PH_A(b_j)=PH_A(a_i)$ does not necessarily imply that $b_j=a_i$. As explained above in the definition of perfect hash function, even if $b_j \neq a_i$ for any i, $PH_A$ will still map $b_j$ to a random integer $PH_A(a_i)$ for some i. In step 60, server 22 then uses the public key of first party 10 to compile $Z_j=r(E(a_i)-E(b_j))+E(p)=r(E(a_i-b_j))+E(p)$, where r is a large random number and p is a predetermined variable, such as for example, metadata that can be used to encode additional information to facilitate the match. For example, p can be formed by concatenating a known fixed value k with some additional value, such as index step 62, the server 22 of second party 20 then sends $Z_j$, for all j, $1 \leq j \leq m$ back to the server 12 of first party 10.

In step 64, after receiving $Z_j$, server 12 of first party 10 uses its private key to decrypt $Z_j$, where $1 \leq j \leq m$. Since $Z_j=r(E(a_i-b_j))+E(p)$, this that if $a_i=b_j$, then decryption of $D_j$, $D(Z_j)=p$. Since p has a known structure, i.e., it starts with known value k, then in step 66 server 12 can detect p and determine which elements $a_i$ of $S_A$ matches an element $b_j$ of $S_B$. However, if $a_i \neq b_j$, then because of the presence of the random number r, $Z_j$ will decrypt to a random number implying element $b_j$ does not matches any element $a_i$. Therefore, by decrypting each $Z_j$, and looking for p, which has a defined structure, first party 10 can determine which elements $S_A$ and $S_B$ have in common, without having to divulge its dataset $S_A$ to second party 20 and without having to receive second party's 20 dataset $S_B$. In step 68, the first party 10 can then share this information with second party 20 by the server 12 sending the matches to server 22. Alternatively, first party 10 and second party 20 can switch roles and repeat the above protocol so that second party 20 can learn of the matches. Thus, the above described processing allows the first party 10 and the second party 20 to find common records in their respective data sets without having to actually share the data sets with each other or any other third party.

It should be noted that finding common records in the respective data sets, or matching elements, does not necessarily mean the records are identical. In many cases it is desirable to match data fields if they are similar but not exactly the same. This is commonly referred to as approximate or fuzzy matching. For example, the words JOHN and JON are different but close and may refer to the same person. There are several well-known algorithms that perform fuzzy matching, including for example, edit distance and Jaro-Winkler. In order to perform fuzzy private matching the fuzzy matching must be performed over encrypted data. The present invention can do fuzzy private matching by computing the edit distance over two encrypted strings using wild card characters (*). For each word, a set containing all variations of that word that are at a desired edit distance from that word is created. For example, the sets containing all variations of words JON and JOHN at edit distance 1 are:

L1={JON, *JON, *ON, J*ON, ..., JON*} and L2={JOHN, *JOHN, *OHN, J*OHN, J*HN, JO*HN, ..., JOHN*}. The words JON and JOHN are replaced with L1 and L2 and the processing proceeds with the private matching algorithm as described earlier. If any variation of the word JON from L1 and any variation of the word JOHN from matched in the private matching step, it will consider JOHN to be a match of JON. Thus, the term matching as use herein is not limited to only an identical match and can also refer to a fuzzy match as described above.

While the processing described in FIG. 2 includes only two parties, the invention is not so limited and the processing can be performed by more than the two parties. For example, a third party could be an intermediary between the first party 10 and second party 20 and used to perform some of the processing based on information received from the first and/or second party, without having to receive either of the data sets $S_A$ or $S_B$. For example, a third party could be used to compute $Z_j$ and return the results to the first party 10.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for determining matching data elements of a first data set and a second data set without having to disclose the first data set and the second data set: the method comprising:

generating by a first processing device, a perfect hash function $PH_A$ from the first data set;

evaluating, by the first processing device, the perfect hash function, $PH_A(a_i)$, for each element $a_i$ of the first data set;

encrypting, by the first processing device, each element $a_i$ of the first data set using a public key to form an encryption, $E(a_i)$;

sending, by the first processing device, the public key, the perfect hash function, $PH_A(a_i)$, and the encryption, $E(a_i)$, for each element $a_i$ of the first data set to a second processing device;

evaluating, by the second processing device, the perfect hash function, $PH_A(b_j)$ for each element $b_j$ of the second data set;

finding, by the second processing device, all i such that $PH_A(b_j)=PH_A(a_i)$;

computing, by the second processing device, $Z_j=r(E(a_i-b_j))+E(p)$, using the received public key and where r is a large random number and p is a predetermined variable that comprises a fixed portion k;

sending, by the second processing device, to the first processing device;

decrypting, by the first processing device using the private key, $Z_j$; and determining, by the first processing device, that element of the first data set matches element $b_j$ of the second data set if the decryption of $Z_j$ includes the fixed portion k of p and that element $a_i$ of the first data set does not match element $b_j$ of the second data set if the decryption of $Z_j$ does not include the fixed portion k of p.

2. A method for a first party to determine matching data elements of a first data set maintained by the first party and a second data set maintained by a second party without having to disclose the first data set to the second party or receive the second data set from the second party, the method comprising:

generating, by a first processing device, a perfect hash function $PH_A$ from the first data set;

evaluating, by the first processing device, the perfect hash function, $PH_A(a_i)$, for each element $a_i$ of the first data set;

encrypting, by the first processing device, each element $a_i$ of the first data set using a public key to form an encryption, $E(a_i)$;

sending, by the first processing device, the public key, the perfect hash function, $PH_A(a_i)$, and the encryption, $E(a_i)$, for each element $a_i$ of the first data set one or more second processing devices to evaluate the perfect hash function, $PH_A(b_j)$ for each element $b_j$ of the second data set, find all i such that $PH_A(b_j)=PH_A(a_i)$ and compute $Z_j=r(E(a_i-b_j))+E(p)$ using the received public key, where r is a large random number and p is a predetermined variable that comprises a fixed portion k;

receiving, from the one or more second processing devices, $Z_j=r(E(a_i-b_j))$ $E(p)$;

decrypting, by the first processing device, $Z_j$; and determining, by the first processing device, that element $a_i$ of the first data set matches element $b_j$ of the second data set if the decryption of $Z_j$ includes the fixed portion k of p and that element $a_i$ of the first data set does not match element $b_j$ of the second data set if the decryption of $Z_j$ does not include the fixed portion k of p.

* * * * *